United States Patent
Hong et al.

(10) Patent No.: US 9,429,475 B2
(45) Date of Patent: Aug. 30, 2016

(54) THERMAL RADIATION SENSOR AND THERMAL IMAGE CAPTURING DEVICE INCLUDING SAME

(71) Applicant: SAMSUNG ELECTRONICS CO., LTD., Suwon-si (KR)

(72) Inventors: Hyungue Hong, Seoul (KR); Sunghyun Nam, Yongin-si (KR); Sookyoung Roh, Yongin-si (KR); Haeseok Park, Yongin-si (KR); Seokho Yun, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/786,572

(22) PCT Filed: Apr. 29, 2014

(86) PCT No.: PCT/KR2014/003746
§ 371 (c)(1),
(2) Date: Oct. 23, 2015

(87) PCT Pub. No.: WO2014/178593
PCT Pub. Date: Nov. 6, 2014

(65) Prior Publication Data
US 2016/0069747 A1    Mar. 10, 2016

(30) Foreign Application Priority Data

Apr. 29, 2013  (KR) .................. 10-2013-0047697

(51) Int. Cl.
*G01J 5/08*      (2006.01)
*G01J 5/00*      (2006.01)
*G01J 5/44*      (2006.01)

(52) U.S. Cl.
CPC .. *G01J 5/00* (2013.01); *G01J 5/08* (2013.01); *G01J 5/0818* (2013.01); *G01J 5/0837* (2013.01); *G01J 5/0853* (2013.01); *G01J 5/44* (2013.01); *G01J 2005/0077* (2013.01)

(58) Field of Classification Search
CPC ...... G01J 2005/0077; G01J 5/00; G01J 5/08; G01J 5/0818; G01J 5/0837; G01J 5/0853; G01J 5/44
See application file for complete search history.

(56) References Cited

U.S. PATENT DOCUMENTS

| | | |
|---|---|---|
| 6,137,107 A | 10/2000 | Hanson et al. |
| 7,667,200 B1 | 2/2010 | Watts et al. |
| 7,820,970 B1 | 10/2010 | Shaw et al. |
| 2005/0211903 A1 | 9/2005 | Harter, Jr. |
| 2006/0175551 A1 | 8/2006 | Fan et al. |
| 2009/0238236 A1 | 9/2009 | Fleury-Frenette et al. |
| 2010/0187419 A1 | 7/2010 | Hu et al. |
| 2011/0062336 A1 | 3/2011 | Ben-Bassat |
| 2011/0204231 A1 | 8/2011 | Razansky et al. |
| 2013/0087707 A1 | 4/2013 | Park et al. |

FOREIGN PATENT DOCUMENTS

KR    10-0994980 B1    11/2010

OTHER PUBLICATIONS

Communication issued on Aug. 18, 2014 by the International Searching Authority in related Application No. PCT/KR2014/003746, (PCT/ISA/210).

*Primary Examiner* — Mark R Gaworecki
(74) *Attorney, Agent, or Firm* — Sughrue Mion, PLLC

(57) ABSTRACT

A thermal radiation sensor may include a thermal absorption layer, an optical resonator surrounding the thermal absorption layer, and a plasmonic absorber provided on the thermal absorption layer, and thus, the thermal radiation sensor may have high sensitivity and may be miniaturized.

19 Claims, 3 Drawing Sheets

THERMAL RADIATION SENSOR AND THERMAL IMAGE CAPTURING DEVICE INCLUDING SAME

TECHNICAL FIELD

Example embodiments relate to a supersensitive thermal radiation sensor and a thermal image capturing device including the same.

BACKGROUND ART

According to the principle of black body radiation, an object radiates a wide-band electromagnetic wave having a maximum value at a desired (or alternatively, a predetermined) wavelength based on a temperature of the object. For example, an object at room temperature radiates infrared rays having a maximum value in about a 10 μm wavelength band. A bolometer is a tool for measuring radiation energy radiated in the surroundings by absorbing an electromagnetic wave having a wavelength in an infrared (or terahertz) band, which is radiated according to the principle of black body radiation, converting the absorbed electromagnetic wave to heat, and detecting a temperature change due to the heat.

Recently, along with the development of microelectromechanical system (MEMS) technology, an infrared detector having a plurality of microbolometers arranged in a two-dimensional array has been produced. The infrared detector may be used for acquiring thermal images, for example, in thermal image cameras and the like.

A bolometer of the Salisbury screen method, which has a λ/4 spacing between a ground flat board and a thermal absorber (λ denotes a central wavelength of an infrared wavelength band to be detected) may be utilized in the thermal image camera. To implement a thermal image camera having high temperature accuracy at high resolution, the size of each pixel may be miniaturized.

DISCLOSURE

Technical Problem

However, when the bolometer of the Salisbury screen method is used, if a screen size in a pixel is reduced, an amount of energy incident to each pixel is reduced, thereby resulting in a decrease in an amount of temperature change and also a decrease in a signal-to-noise ratio.

In addition, since a microbolometer detects a temperature change due to heat by using an electrical characteristic (resistance value), white noise may occurs. Thus, when heat is detected using microbolometers, accuracy may be degraded.

Technical Solution

One or more example embodiments relate to supersensitive thermal radiation sensors for accurately detecting heat by increasing sensitivity.

One or more example embodiments relate to a supersensitive thermal image capturing device for accurately detecting heat by increasing sensitivity.

Additional aspects of example embodiments will be set forth in part in the description which follows and, in part, will be apparent from the description, or may be learned by practice of the presented example embodiments.

According to an example embodiment, a thermal radiation sensor includes: a post; a thermal absorption layer provided on the post; an optical resonator around the thermal absorption layer; a plasmonic absorber provided on the thermal absorption layer; and a waveguide coupler that is separately disposed from the optical resonator.

The plasmonic absorber may be formed of a metal.

The plasmonic absorber may be formed of at least one selected from the group consisting of titanium (Ti), gold (Au), silver (Ag), platinum (Pt), copper (Cu), aluminum (Al), nickel (Ni), and chromium (Cr).

The plasmonic absorber may include at least one nanorod or at least one nanoparticle.

The plasmonic absorber may have a cylindrical shape or a hemispherical shape.

The plasmonic absorber may be arranged in a polygonal shape.

The thermal absorption layer may be formed of a silica or a silicon nitride.

The thermal absorption layer may be formed of glass, a silicon dioxide ($SiO_2$), or a silicon nitride ($Si_3N_4$).

The optical resonator may have a circular tube shape.

The thermal absorption layer may have a circular shape.

The thermal absorption layer may have a radius in a range of 20 μm to 120 μm.

The optical resonator may resonate in a wavelength band in a range of 8 μm to 12 μm.

The thermal absorption layer may absorb infrared rays.

The post may be formed of a dielectric.

The post may be formed of the same material as the thermal absorption layer.

The post, the thermal absorption layer, and the optical resonator may be formed in one body.

The post may be formed in a head-cut cone shape.

The optical resonator may circumscribe the thermal absorption layer.

According to another example embodiment, a thermal image capturing device includes: a substrate; and a thermal radiation sensor array having a plurality of thermal radiation sensors arranged on the substrate, wherein each of the thermal radiation sensor includes: a post; a thermal absorption layer provided on the post; an optical resonator around the thermal absorption layer; a plasmonic absorber provided on the thermal absorption layer; and a waveguide coupler that is separately disposed from the optical resonator.

Advantageous Effects

According to the one or more example embodiments, since a thermal radiation sensor is miniaturized and has a high thermal absorption ratio, the sensitivity of the thermal radiation sensor may be increased.

According to the increase in the sensitivity, thermal radiation may be more accurately detected. In addition, since the thermal radiation sensor detects a temperature change due to heat by using optical characteristics, the influence due to white noise may be reduced or removed.

DESCRIPTION OF DRAWINGS

These and/or other aspects will become apparent and more readily appreciated from the following description of the example embodiments, taken in conjunction with the accompanying drawings in which.

MODE FOR INVENTION

Figure 1:
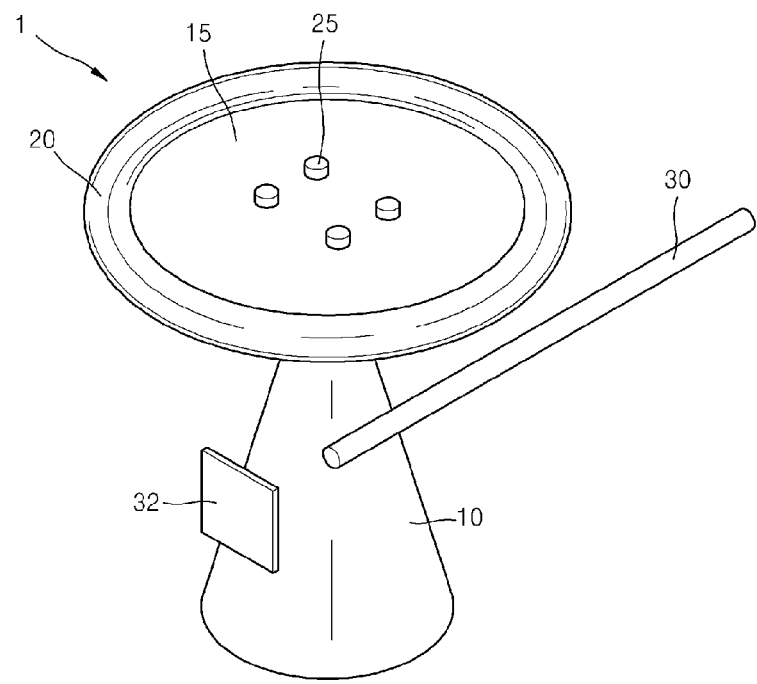
FIG. 1 is a perspective view of a thermal radiation sensor according to an example embodiment.

A thermal radiation sensor and a thermal image capturing device including the same according to example embodiments will now be described in detail with reference to the accompanying drawings, wherein like reference numerals in the drawings refer to like elements, and the sizes of components in the drawings may be exaggerated for convenience and clarity of description. In this regard, the example embodiments may have different forms and should not be construed as being limited to the descriptions set forth herein. Accordingly, the example embodiments are merely described below, by referring to the figures, to explain aspects of the present description. As used herein, expressions such as "at least one of," when preceding a list of elements, modify the entire list of elements and do not modify the individual elements of the list.

Example embodiments will now be described more fully with reference to the accompanying drawings, in which some example embodiments are shown. In the drawings, the thicknesses of layers and regions are exaggerated for clarity. Like reference numerals in the drawings denote like elements.

Detailed illustrative embodiments are disclosed herein. However, specific structural and functional details disclosed herein are merely representative for purposes of describing example embodiments. Example embodiments may be embodied in many alternate forms and should not be construed as limited to only those set forth herein.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures. It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Figure 2:
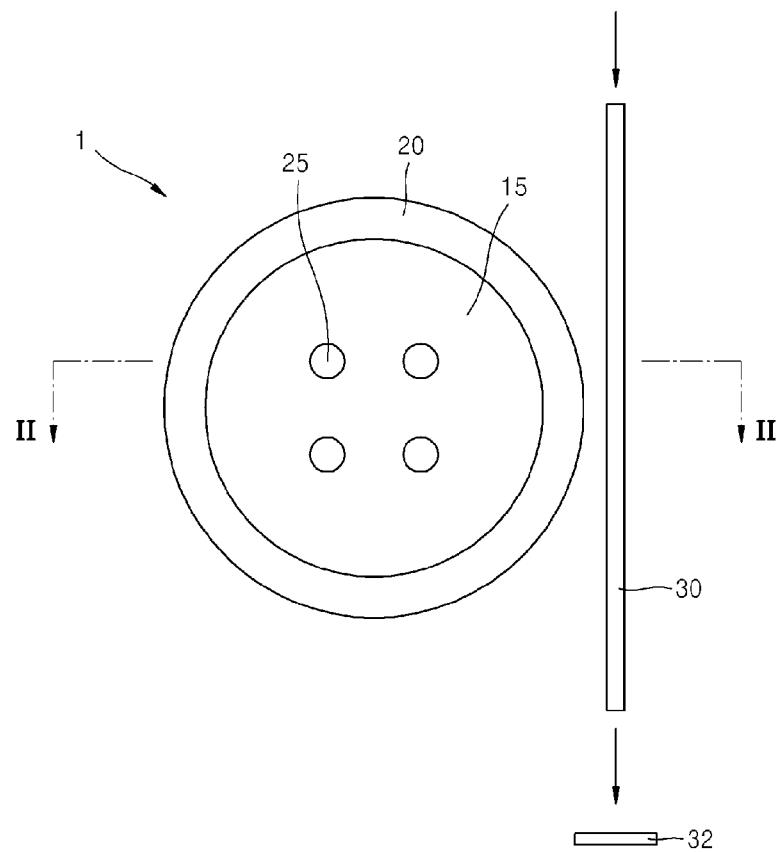
FIG. 2 is a top view of the thermal radiation sensor of FIG. 1.

FIG. 1 is a perspective view of a thermal radiation sensor according to an example embodiment. FIG. 2 is a top view of a thermal radiation sensor, and FIG. 3 is a cross-sectional view of a thermal radiation sensor.

Figure 3:
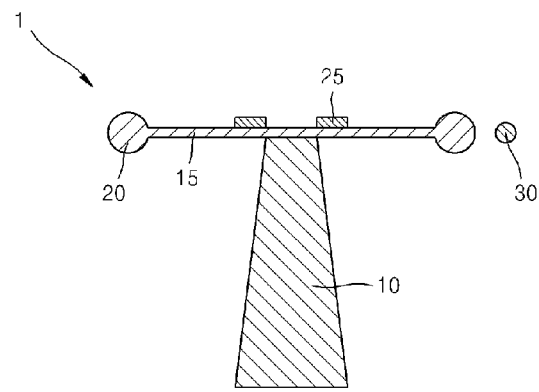
FIG. 3 is a cross-sectional view along line II-II of FIG. 2.

Referring to FIGS. 1 to 3, a thermal radiation sensor 1 may include a post 10, a thermal absorption layer 15 provided on the post 10, and an optical resonator 20 around the thermal absorption layer 15. For example, the optical resonator 20 may circumscribe the thermal absorption layer 15 such that the optical resonator 20 outlines the thermal absorption layer 15. In one embodiment, the circumscribing of the thermal absorption layer 15 may be such that the optical resonator 20 circles the thermal absorption layer 15. The optical resonator 20 may be provided in contact with the thermal absorption layer 15. Alternatively, the optical resonator 20 may be formed in a same body as the thermal absorption layer 15. Alternatively, the post 10, the thermal absorption layer 15, and the optical resonator 20 may all be formed in a same body.

A plasmonic absorber 25 is provided on the thermal absorption layer 15. A waveguide coupler 30 may be provided adjacent to the optical resonator 20. The waveguide coupler 30 may be disposed separate from the optical resonator 20.

The post 10 may support the thermal absorption layer 15 and also restrain the dissipation of heat absorbed by the thermal absorption layer 15. The post 10 may be formed of, for example, a dielectric. The post 10 may have various shapes capable of minimizing the dissipation of the heat. For example, the post 10 may have a head-cut cone shape.

The thermal absorption layer 15 may be formed of a material absorbing heat from the outside. The thermal absorption layer 15 may be formed of silica or silicon nitride ($SiN_x$). The thermal absorption layer 15 may be formed of glass, silicon dioxide ($SiO_2$), or silicon nitride ($Si_3N_4$). The thermal absorption layer 15 may be formed of a thin film and formed in a circular shape. However, the shape of the thermal absorption layer 15 is not limited thereto, and the thermal absorption layer 15 may be formed in various shapes.

The optical resonator 20 may be circumscribing the thermal absorption layer 15 in a contact manner. The optical resonator 20 may be formed in, for example, a circular tube shape. However, the shape of the optical resonator 20 is not limited thereto and may be of course changed to various shapes. The optical resonator 20 may be formed to resonate in a desired (or alternatively, a predetermined) wavelength band. The optical resonator 20 has a resonance frequency (fo) represented by Equation 1.

$$fo = c \times n \times m / d \qquad \text{Eq.(1)}$$

In Equation 1, c denotes the velocity of light, n denotes an index of refraction of the optical resonator 20, m denotes a natural number indicating the degree of a mode, and d denotes a propagation and returning distance of light in a resonance mode. For example, when the optical resonator 20 is formed in a circular shape, as shown in FIG. 1, d corresponds to the circumference of a circle.

According to Equation 1, the resonance frequency fo of the optical resonator 20 varies as d varies. Thus, a change in the shape of the optical resonator 20 may be detected by detecting a change in the resonance frequency fo of the optical resonator 20. The change in the shape of the optical resonator 20 is associated with a change in the shape of the thermal absorption layer 15. The shape of the thermal absorption layer 15 may change due to heat.

The change in the shape of the thermal absorption layer 15 due to heat may be detected by detecting the change in the resonance frequency fo (or a resonance wavelength) of the optical resonator 20. When the thermal absorption layer 15 absorbs heat, a temperature of the thermal absorption layer 15 increases, and thus the shape of the thermal absorption layer 15 changes, thereby resulting in shifting the resonance frequency fo of the optical resonator 20. The change in the resonance frequency fo of the optical resonator 20 may be detected using the waveguide coupler 30 that is provided adjacent to the optical resonator 20. Light including a resonance frequency component of the optical resonator 20 is transmitted through the waveguide coupler 30. Although not shown, a light source for inputting light to the waveguide coupler 30 is further provided. The light is transmitted from the light source to the waveguide coupler 30 and is coupled to the optical resonator 20 from the waveguide coupler 30, and a transmission spectrum of the coupled light varies according to the resonance frequency fo of the optical resonator 20. The change in the resonance frequency fo of the optical resonator 20 may be detected by detecting a change in the transmission spectrum.

For example, a tunable laser may be provided as the light source. By tuning a frequency of the laser to be close to the resonance frequency fo and measuring thermal radiation, a change in the intensity of a transmitted laser may be detected by an optical detector 32. Alternatively, when a broadband light source, such as a light-emitting diode (LED), is used, by analyzing a spectrum of transmitted light, a change in the resonance frequency fo due to thermal radiation may be detected.

As described above, since the thermal radiation sensor 1 detects a temperature change due to heat by using optical characteristics, the influence due to white noise may be reduced or removed.

Referring to Equation 1, as an initial value of d is small, the resonance frequency fo is shifted according to a change in d, thereby making the thermal radiation sensor 1 have a relatively high sensitivity. However, when the initial value of d is small, an absorption ratio of thermal energy absorbed by the thermal absorption layer 15 may be small, thereby causing a decrease in sensitivity. The plasmonic absorber 25 may compensate for a decrease in the thermal absorption ratio due to the miniaturization of the thermal absorption layer 15.

The plasmonic absorber 25 may increase the thermal absorption ratio of the thermal absorption layer 15 by generating localized surface plasmon resonance in a wavelength band of interest, for example, in an infrared wavelength band of about 8 µm to about 14 µm. The surface plasmon resonance may occur due to an interaction between free electrons and light on an interface between the plasmonic absorber 25 and the thermal absorption layer 15. For example, the surface plasmon may occur when energy delivered by photons of the thermal absorption layer 15 on the interface between the plasmonic absorber 25 and the thermal absorption layer 15 moves due to collective excitation of free electrons existing in the plasmonic absorber 25.

The plasmonic absorber 25 may be formed of, for example, a metal. The surface plasmon is a kind of electromagnetic wave generated due to charge density oscillation occurring on the surface of the metal. The thermal absorption ratio and a signal-to-noise ratio may be improved by the localized surface plasmon resonance using the plasmonic absorber 25.

For example, the plasmonic absorber 25 may include at least one metal selected from the group consisting of titanium (Ti), gold (Au), silver (Ag), platinum (Pt), copper (Cu), aluminum (Al), nickel (Ni), and chromium (Cr). The plasmonic absorber 25 may be of course formed of an alloy of at least two metals selected from the group consisting of Ti, Au, Ag, Pt, Cu, Al, Ni, and Cr. However, the plasmonic absorber 25 is not limited thereto. The plasmonic absorber 25 may have various structures capable of absorbing incident thermal energy. In addition, the plasmonic absorber 25 may be arranged in a polygonal shape.

As described above, the plasmonic absorber 25 may efficiently absorb thermal energy, e.g., infrared rays, by generating surface plasmon resonance in a wavelength band of interest. Heat may be absorbed using the plasmonic absorber 25 at an absorption ratio that is higher than that according to a cross section of the thermal absorption layer 15. Accordingly, even though the cross section (or size) of the thermal absorption layer 15 is small, a high thermal (or infrared) absorption ratio may be obtained.

The plasmonic absorber 25 may include at least one nanorod or at least one nanoparticle. As shown in FIG. 1, the plasmonic absorber 25 may have a cylindrical shape. However, the cylindrical shape is only illustrative, and the plasmonic absorber 25 may have various shapes other than the cylindrical shape.

An operation of a thermal radiation sensor according to an example embodiment will now be described.

If it is assumed that the optical resonator 20 is formed in a circular tube shape, as shown in FIG. 1, and a radius of the circle is r, when the condition in Equation 2 is satisfied, the optical resonator 20 may resonate.

$$2\pi r = m \times n \times \lambda \qquad \text{Eq.(2)}$$

In Equation 2, m denotes a natural number, $\lambda$ denotes the wavelength of light, and n denotes an index of refraction.

The resonance frequency fo may be represented by Equation 3 using $\lambda = c/fo$.

$$fo = m \times n \times c / (2\pi r) \qquad \text{Eq.(3)}$$

Because the propagation and returning distance of light of the optical resonator 20 in the resonance mode d may be represented by 2πr=d, Equation 3 may be represented by Equation 4.

$$fo = m \times n \times c / d \qquad \text{Eq.(4)}$$

Equation 5 may be obtained by differentiating Equation 3 by d.

$$\Delta fo / \Delta d = -m \times n \times c / d^2 \qquad \text{Eq.(5)}$$

Since the shape of the thermal absorption layer 15 changes according to a temperature change due to heat absorbed by the thermal absorption layer 15, and the circumference of the optical resonator 20 changes according to the change in the shape of the thermal absorption layer 15, d may be a function of the temperature change. As illustrated in Equation 5, because d may be a function of the temperature change, the resonance frequency fo may vary according to the temperature change.

A temperature change ΔT according to thermal absorption of the thermal absorption layer 15 may be represented by Equation 6.

$$\Delta T \propto \eta \Delta \phi / G_{th} \qquad \text{Eq.(6)}$$

In Equation 6, η denotes the thermal absorption ratio of the thermal absorption layer 15, φ denotes thermal energy, and $G_{th}$ denotes a thermal conductivity constant which may be determined by the physical property and structure of a dielectric that blocks heat, such as the post 10.

According to Equation 6, since the thermal energy is proportional to an area of the thermal absorption layer 15, the thermal energy may be proportional to the square of the radius r of the thermal absorption layer 15, if the thermal absorption layer 15 has the circular shape. According to Equations 5 and 6, the resonance frequency fo and the temperature change ΔT have a trade-off relationship such that the resonance frequency fo varies in inverse proportion to a change in $d^2$ (or $r^2$) according to the temperature change ΔT, whereas the temperature change ΔT varies in proportion to $r^2$.

In other words, as d (or r) decreases, the resonance frequency fo is shifted, thereby increasing the sensitivity of the thermal radiation sensor 1. However, when d is small, a thermal absorption amount may be small. If the amount of thermal absorption is small, there may be less heat generated, resulting in a change in d also being small, and thus, the sensitivity of the thermal radiation sensor 1 may be reduced as a result.

The thermal absorption amount reduced according to a decrease in the area of the thermal absorption layer 15 may be compensated by the plasmonic absorber 25.

The plasmonic absorber 25 may increase a thermal absorption ratio by localized surface plasmon resonance. Thus, by increasing the sensitivity of the thermal radiation sensor 1 caused by a decrease in the area of the thermal absorption layer 15 or the circumference d of the plasmonic absorber 25 and simultaneously increasing the thermal absorption ratio using the plasmonic absorber 25, the same-area-based sensitivity of the thermal absorption layer 15 may be improved. For example, the thermal absorption layer 15 may have a radius in a range of 20 μm to 120 μm. As described above, the thermal radiation sensor 1 may miniaturize the thermal absorption layer 15 while maintaining the intensity of incident light and increasing the sensitivity of the thermal radiation sensor 1.

Figure 4:
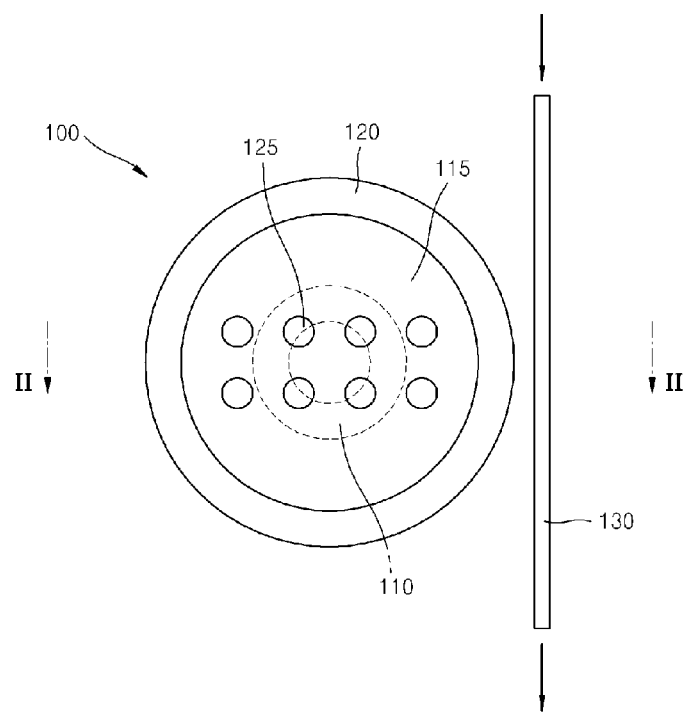
FIG. 4 is a top view of an example of the thermal radiation sensor of FIG. 1 of which a plasmonic absorber has been modified, according to another example embodiment.
Figure 5:
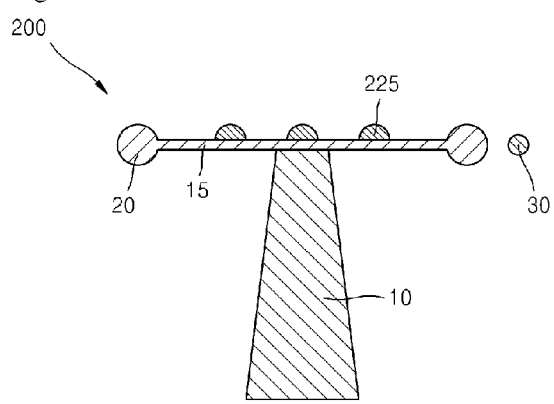
FIG. 5 is a cross-sectional view of an example of the thermal radiation sensor of FIG. 1 of which the plasmonic absorber has been modified, according to another example embodiment.

FIG. 4 is a top view of an example of the thermal radiation sensor 1 of FIG. 1 of which the plasmonic absorber 25 has been modified and FIG. 5 is a cross-sectional view thereof according to another example embodiment.

Referring to FIGS. 4 and 5, a thermal radiation sensor 100 shown in FIG. 4 may include a post 110, a thermal absorption layer 115 provided on the post 110, an optical resonator 120 circumscribing the thermal absorption layer 115, and a plasmonic absorber 125 provided on the thermal absorption layer 115. The optical resonator 120 may be provided in contact with the thermal absorption layer 115 or formed in one body with the thermal absorption layer 115. A waveguide coupler 130 may be provided adjacent to the optical resonator 120. The waveguide coupler 130 may be disposed separate from the optical resonator 120.

Since the components of FIG. 4, except for the plasmonic absorber 125, are substantially the same as described with reference to FIG. 1, a detailed description thereof is omitted.

The plasmonic absorber 125 may include a nanorod or a nanoparticle and may be formed of a metal. The plasmonic absorber 125 may be variously implemented in a shape, in number, and in an arrangement structure to increase a thermal absorption ratio of the thermal absorption layer 115.

In FIG. 1, the plasmonic absorber 25 is four in number and arranged in the form of a 2×2 matrix. In contrast, in FIG. 4, the plasmonic absorber 125 is eight in number and arranged in the form of a 4×2 matrix. However, the plasmonic absorber 125 is not limited thereto, and a shape, the number, an arrangement method, and the like of the plasmonic absorber 125 may be variously modified according to a shape or size of the thermal absorption layer 115 to increase a thermal absorption ratio.

Compared with FIG. 1, a thermal radiation sensor 200 of FIG. 5 is an example in which a shape of a plasmonic absorber 225 is changed. The plasmonic absorber 225 may have a hemispherical shape. However, the plasmonic absorber 225 may have a polygonal cylindrical shape, a cross shape, or the like.

Figure 6:
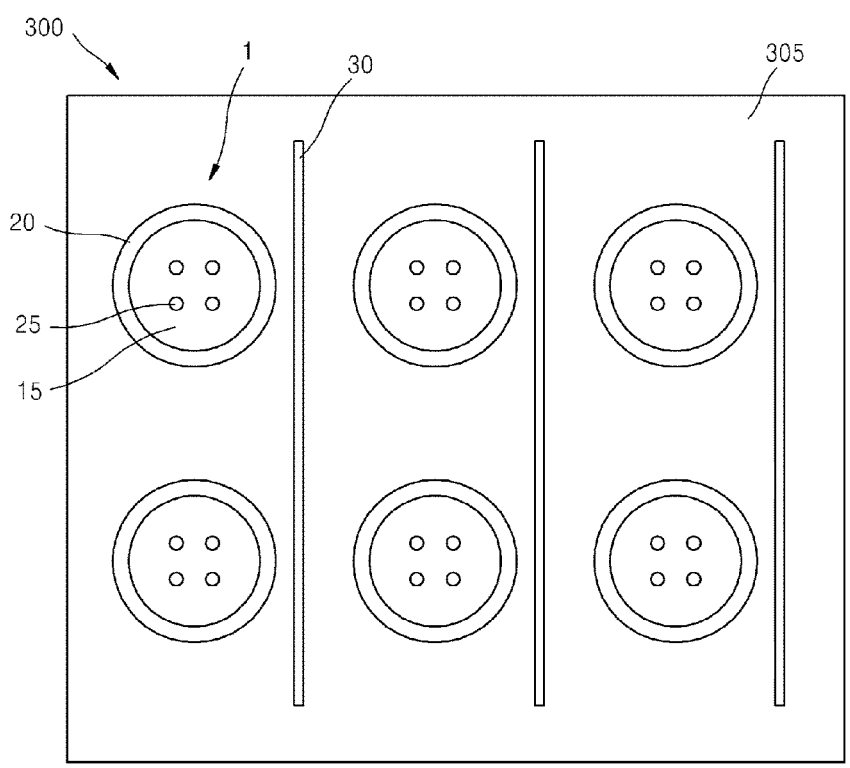
FIG. 6 is a schematic top view of a thermal image capturing device including thermal radiation sensors, according to an example embodiment.

FIG. 6 is a schematic top view of a thermal image capturing device according to an example embodiment.

Referring to FIG. 6, a thermal image capturing device 300 may include a substrate 305 and a thermal radiation sensor array having a plurality of thermal radiation sensors 1 arranged on the substrate 305. Light in a desired (or alternatively, a predetermined) wavelength band is radiated from a certain object by black body radiation and is absorbed by the plurality of thermal radiation sensors 1. A temperature change in each of the plurality of thermal radiation sensors 1 may be detected by a change in the resonance frequency fo of the optical resonator 20. The change in the resonance frequency fo may be displayed as an image. For example, the thermal image capturing device 300 according to an example embodiment may implement a thermal image camera using a miniaturized thermal radiation sensor having high sensitivity.

Although not shown, a driving circuit for controlling an operation of the thermal radiation sensor 1 and reading a detected optical signal, an image signal processing circuit for processing an image signal, and various conductive wirings may be further disposed on the substrate 305.

As described above, according to the one or more example embodiments, since a thermal radiation sensor is miniaturized and has a high thermal absorption ratio, the sensitivity of the thermal radiation sensor may be increased. According to the increase in the sensitivity, thermal radiation may be more accurately detected. In addition, since the thermal radiation sensor detects a temperature change due to heat by using optical characteristics, the influence due to white noise may be reduced or removed.

While a thermal radiation sensor and a thermal image capturing device including the same according to example embodiments have been described with reference to example embodiments shown in the drawings to help the understanding, they are only illustrative, and it will be understood by one of ordinary skill in the art that various changes in form and details may be made therein without departing from the spirit and scope of the example embodiments as defined by the following claims.

The invention claimed is:

1. A thermal radiation sensor comprising:
   a post;
   a thermal absorption layer disposed on the post;
   an optical resonator around the thermal absorption layer;
   a plasmonic absorber disposed on the thermal absorption layer; and
   a waveguide coupler disposed separately from the optical resonator.

2. The thermal radiation sensor of claim 1, wherein the plasmonic absorber includes a metal.

3. The thermal radiation sensor of claim 2, wherein the plasmonic absorber includes one or more of titanium (Ti), gold (Au), silver (Ag), platinum (Pt), copper (Cu), aluminum (Al), nickel (Ni), and chromium (Cr).

4. The thermal radiation sensor of claim 1, wherein the plasmonic absorber includes at least one nanorod or at least one nanoparticle.

5. The thermal radiation sensor of claim 1, wherein the plasmonic absorber has a cylindrical shape or a hemispherical shape.

6. The thermal radiation sensor of claim 1, wherein the plasmonic absorber is arranged in a polygonal shape.

7. The thermal radiation sensor of claim 1, wherein the thermal absorption layer is formed of one of silica and silicon nitride.

8. The thermal radiation sensor of claim 7, wherein the plasmonic absorber is formed of one of glass, silicon dioxide ($SiO_2$), and silicon nitride ($Si_3N_4$).

9. The thermal radiation sensor of claim 1, wherein the optical resonator has a circular tube shape.

10. The thermal radiation sensor of claim 1, wherein the thermal absorption layer has a circular shape.

11. The thermal radiation sensor of claim 10, wherein the thermal absorption layer has a radius of 20 μm to 120 μm.

12. The thermal radiation sensor of claim 1, wherein the optical resonator is configured to resonate in a wavelength band of 8 μm to 12 μm.

13. The thermal radiation sensor of claim 1, wherein the thermal absorption layer is configured to absorb infrared rays.

14. The thermal radiation sensor of claim 1, wherein the post is formed of a dielectric.

15. The thermal radiation sensor of claim 1, wherein the post is formed of a same material as the thermal absorption layer.

16. The thermal radiation sensor of claim 1, wherein the post, the thermal absorption layer, and the optical resonator are formed on a same body.

17. The thermal radiation sensor of claim 1, wherein the post is formed in a head-cut cone shape.

18. The thermal radiation sensor of claim 1, wherein the optical resonator circumscribes the thermal absorption layer.

19. A thermal image capturing device comprising:
   a substrate; and
   a thermal radiation sensor array having a plurality of thermal radiation sensors arranged on the substrate, each of the thermal radiation sensors including,
   a post;
   a thermal absorption layer disposed on the post;
   an optical resonator around the thermal absorption layer;
   a plasmonic absorber disposed on the thermal absorption layer; and
   a waveguide coupler disposed separately from the optical resonator.

* * * * *